2 Sheets—Sheet 1.

S. R. KROM.

ORE CRUSHING MACHINE.

No. 10,085. Reissued Apr. 11, 1882.

WITNESSES:
Harold Serrell
Chas. H. Smith

INVENTOR
Stephen R. Krom.
BY Lemuel W. Serrell
ATTORNEY

S. R. KROM.

ORE CRUSHING MACHINE.

No. 10,085. Reissued Apr. 11, 1882.

Witnesses
Harold Serrell
Chas H. Smith

Inventor
per Stephen R Krom
Lemuel W. Serrell
atty

UNITED STATES PATENT OFFICE.

STEPHEN R. KROM, OF PLAINFIELD, NEW JERSEY.

ORE-CRUSHING MACHINE.

SPECIFICATION forming part of Reissued Letters Patent No. 10,085, dated April 11, 1882.

Original No. 158,800, dated January 19, 1875. Application for reissue filed December 12, 1881.

*To all whom it may concern:*

Be it known that I, STEPHEN R. KROM, of Plainfield, in the county of Union and State of New Jersey, have invented certain Improvements relating to Crushing-Machines for Crushing Ore and Analogous Materials, of which the following is a specification.

Before my invention a crushing device had been made in which the moving jaw was carried up and down and swung laterally by an eccentric acting directly upon the lever end of the jaw, as in Letters Patent No. 44,450. In this case the stationary jaw and the resisting abutment to the moving jaw were held by tie-bolts and cross-beams both at the ends and across below them. The strain, however, of the eccentric, as it acted upon the lever end of the jaw, was resisted by the pillar-blocks that supported the shaft.

My invention, as distinguished from pre-existing devices, relates to the combination, with the stationary and moving jaws, of toggle-bars, an actuating link and eccentric, and tie-bolts that connect the stationary jaw with the abutment for the toggles, whereby the crushing force is applied by the toggles to the jaw in line, or nearly so, with the tie-bolts, so that the strain is taken almost entirely by the tie-bolts and very little comes upon the cast-iron frame. The toggle-bars are so placed in relation to the shaft and the bearings upon the frame of the machine that the force exerted by the eccentric and link upon the toggles tends to press the shaft against the bearings in the frame; hence there is but little strain upon the bolts that hold the caps of the bearings or journal-boxes. I also provide means, as more fully described hereinafter, for lessening the risk of the machine being broken by a non-frangible substance—such as a drill-point—passing in between the jaws. The fly-wheel is held by friction upon the shaft, and the abutment for the toggles may give way by the rupture of breakable cups that are applied to the tie-bolts. These cups can be easily replaced if broken, and they prevent the rupture of more costly parts in the machine.

The accompanying drawings form a part of this specification.

Figure 1:
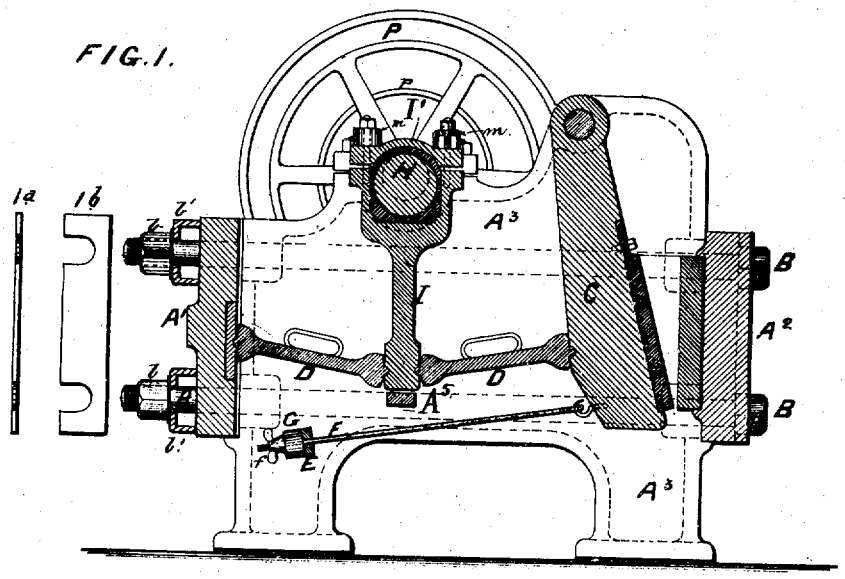
Figure 2:
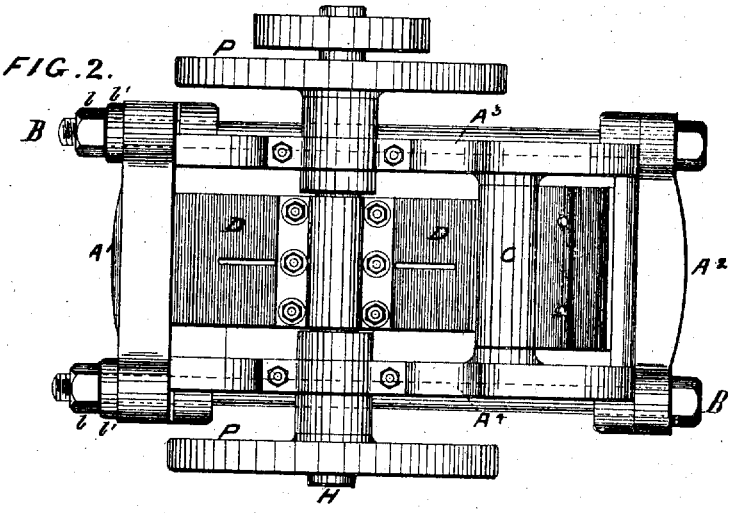
Figure 5:
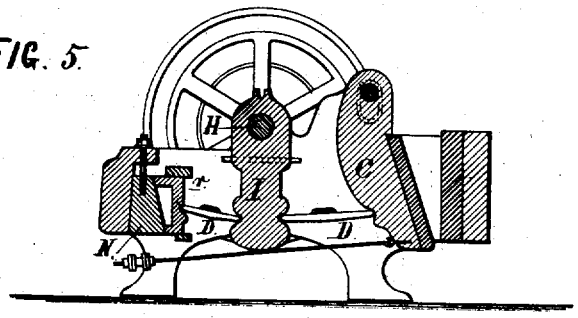
Figure 6:
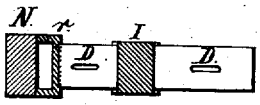
Figure 3:
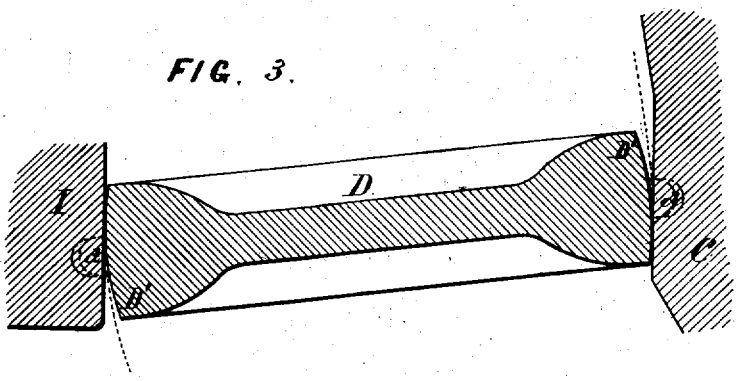
Figure 4:
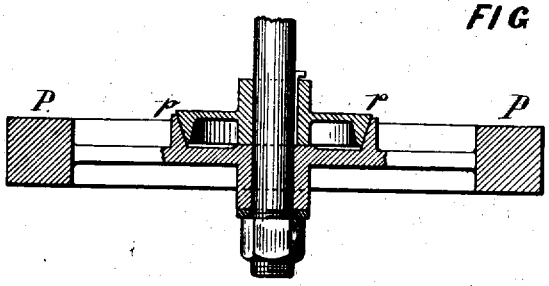

Figure 1 is a longitudinal section. Fig. 2 is a plan view. Fig. 3 is a view of a portion on a larger scale, and Fig. 4 is a central section through the fly-wheel and a frictional connection or clutch employed therewith to allow the fly-wheel to slip when necessary to relieve excessive strain. Figs. $1^a$ and $1^b$ give two views of certain removable and exchangeable pieces, usually termed "shimming-pieces." Figs. 5 and 6 represent an application of a portion of the improvement to the style of machine known as the "Blake crusher," Fig. 5 being a longitudinal section and Fig. 6 a horizontal section, showing a portion of the working parts.

Similar letters of reference indicate corresponding parts wherever they occur.

I make the stout framing $A'$ $A^2$, &c., in several parts capable of being readily separated for more convenient transportation. In some situations it is important to be able to transport the machine in detail over bad roads, and sometimes even on the backs of animals. The division of the framing into four parts, in connection with my means of connecting them for use, affords an important advantage in this respect.

B B are longitudinal through-bolts, provided with nuts *b* and with hollow washers *b'*, of thin cast metal, (indicated in section in Fig. 1.) In case of an extraordinary strain in consequence of receiving a hammer-head, drill-point, or the like into the crusher, these hollow washers still further insure against a breakage of any important part by providing breaking places additional to the peculiar provisions to be described below. The crushing of these washers *b'*, which may be employed at both ends or at either end of the machine, will relieve the strain and prevent the fracture of the more important parts.

The jaw C is held back to a tight bearing on the double toggle D by means of one or more rods, F, connecting it with a cross-bar, E, through the medium of a sufficient mass of rubber, G. A thumb-nut, *f*, allows the tension of this rubber G to be varied. The toggles D D are operated from the stout cranked shaft H by a connecting-link, I, which is also provided with breaking cups *m*, conveniently placed to crush whenever the resistance becomes too great. It is at this point, rather than by a breakage of the hollow washers *b'*, that the machine may be relieved whenever the resistance becomes too great. Cheap and easily-replaceable hollow castings *m* may be employed, so as to allow the fracture to be repaired with little expense and only a few moments' delay.

The link I is provided with boxes to embrace the crank or eccentric. It will be apparent that the revolution of the shaft and eccentric H gives an up-and-down motion to the link I and straightens the toggle in the crushing operation, and bends the toggle as the jaw is opened. The strain will tend to press the shaft down into its bearings upon the frames $A^3$ $A^4$. The cap I′ of the link I is represented as secured by bolts with breaking cups *m*, which are proportioned so that they will be ruptured before the bolts or cap are injured, thereby relieving the parts from strain in case of the jaw becoming obstructed in its movement. I remark that, if the toggle-bars were reversed in position relatively to the eccentric, the breaking cups would have to be applied between the eccentric and the toggles, instead of to the top of the cap. As here shown, the upward movement of the link I induces the closing of the jaw C by acting on the double toggle D D. The construction of these parts is such as to allow a considerable variation in the extent of motion of the jaw by simply removing the toggle-pieces D D and introducing others which are differently formed on their rolling-faces. In Fig. 3 it will be seen that the small bead *d* at each end of these parts is simply to support the weight and maintain the proper positions of the toggle-pieces. The end strain is all received on the rolling-surfaces D′ D′. These may be portions of true cylinders, or they may be variously modified. On removing the thumb-nut *f*, and thus liberating the rod F, the jaw C may be swung forward sufficiently to allow the toggle-pieces D to be removed and others substituted. If the substituted toggle-pieces be longer or shorter than those removed, but with the same form of the ends, the jaw C will vibrate to about the same extent as before; but its mean opening will be greater or less than before. If, with the same length of the toggle-pieces D, a different form of their rolling ends D′ be adopted, the motion of the jaw C from a given vertical movement of the link I will be greater or less.

By providing several sets of toggle-pieces, each differing a little from the others, I can, with little labor or delay, vary sufficiently the action of the machine to adapt it to all ordinary varieties of work.

I am able to compensate for the gradual wear, which is inevitable, on the face of the crushing-jaw C and of the adjacent surface by substituting successively longer toggle-pieces D D. Another plan which may be employed in this connection is to introduce shimming-pieces between the stout end-pieces or abutments, A′ $A^2$, and the adjacent side frames, $A^3$ $A^4$. Figs. $1^a$ and $1^b$ show two views of one of the shimming-pieces. When it becomes necessary to compensate for wear I slack the nuts *b*, remove the shimming-pieces, and again set up the nuts, and the crushing-jaws will be contracted the thickness of the shimming-pieces, and will in consequence work correspondingly closer.

In practice I propose to introduce three or or more shimming-pieces in each joint and remove them one at a time as it becomes necessary.

I prefer to form the breaking cups *b′* and *m* of cast-iron. A sufficient stock of these is provided, and a new cup is to be introduced after removing the fragments of the preceding cup. The depth of each cup *m* should be somewhat greater than the whole motion of the link I, so that in case of the crusher being tightly filled with an unyielding material the link I may, after the fracture of the cups *m*, stand idly, resting on the cross-bar or stop $A^5$, and allow the crank to play idly around without causing any motion to the jaw C. Another plan might be to make the holes through the flange of the cap large enough to allow the nuts which rest on the breaking cups to pass completely through the cap when the cups are broken, thus allowing the link to fall away completely. The bolts B connecting the sectional framing may be very readily applied and removed, and by their positions they receive the strain directly, relieving the framing of most of the strain. This construction also enables me to make a very light frame in comparison to the plan of making the frame of one solid casting.

When the shaft H is stopped suddenly by an obstruction in the jaws the momentum of the fly-wheel P will tend to break some of the parts. To overcome this risk I employ a frictional connection between the fly-wheel P and its shaft, as shown at *p*, Fig. 4, so that the fly-wheel may slip around in case of such sudden stoppage of the shaft.

Referring to Figs. 5 and 6, D D are the toggles, and I the operating-link which, through the medium of the toggles, gives motion to the jaw C. The link I is operated by the eccentric and shaft H, and is free to swing as required, so as to always stand between and properly operate the toggles D, one of which abuts against the adjustable piece *r*, adjustable by means of the stout wedge N, as will be understood. The piece *r* is made hollow, and care being taken to provide a number of these of about uniform size and strength, they may be introduced in succession as they are broken. The effect of the fracture of the piece *r* in this modification of the Blake crusher, Figs. 5 and 6, is, in the more important respects, equivalent to that of the breaking cups *m* in the preferable form of the machine, Figs. 1 and 2.

In ore-crushing machines the semi-cylindrical ends of the toggles rub against the interior surfaces of the similarly-shaped recesses, causing friction and wear. In my improvement the toggles roll upon nearly flat surfaces, and there is little or no friction or wear.

I claim as my invention—

1. The hollow washers $b'$ on the tie-bolts B, in combination with the nuts $b$ and stout framing $A'$ $A^2$, and with the parts C D D I H, as specified.

2. The breaking cups $m$, in combination with the crank H, link I, toggles D D, and crushing-jaw C, as specified.

3. The combination, with the stationary and moving crushing-jaws, the toggle mechanism, the frame, and the tie-bolts, of hollow breakable pieces having less strength than the other parts of the machine, so as to give way under unusual strain and prevent injury to the other parts, substantially as set forth.

4. The exchangeable toggles D D, having rolling-surfaces, and the supporting projections $d$ $d$, in combination with the crushing-jaw C and link I, as specified.

5. In a crushing-machine, the combination, with the jaws, of toggles D D, having rolling ends, and supports for the toggles, substantially as specified.

6. In a crushing-machine, the combination, with the crushing-jaw, actuating-shaft, and intervening mechanism for moving the jaw, of a fly-wheel on the shaft and a frictional connection between the fly-wheel and shaft, for the purposes and substantially as specified.

7. In a crushing-machine, the combination, with the stationary and moving jaws, supporting-frames, toggle-bars, and actuating mechanism, of tie-bolts running in the line of the strain and connecting the stationary jaw to the abutment of the toggle, substantially as set forth.

8. The combination of the sectional framing $A'$ $A^2$ and longitudinal tie-bolts B with the ore-crushing jaw C, toggles D, and link I, the tie-bolts being arranged parallel to and directly in the line of the strain, substantially as specified.

Signed by me this 6th day of December, A. D. 1881.

S. R. KROM.

Witnesses:
GEO. T. PINCKNEY,
HAROLD SERRELL.